United States Patent [19]

Bowler et al.

[11] Patent Number: 4,927,205
[45] Date of Patent: May 22, 1990

[54] ROTATIONAL CONTAINER HOLDING DEVICE AND METHOD

[75] Inventors: Peter T. Bowler, Amherst Township, Lorain County; Thomas J. Zeeff, Cleveland, both of Ohio

[73] Assignee: Feco Engineered Systems, Inc., Cleveland, Ohio

[21] Appl. No.: 376,958

[22] Filed: Jul. 6, 1989

Related U.S. Application Data

[63] Continuation of Ser. No. 069,704, Jul. 2, 1987, abandoned.

[51] Int. Cl.$^5$ .................. B65G 47/90; B66C 1/54
[52] U.S. Cl. ........................ 294/94; 118/503; 118/630; 198/803.12
[58] Field of Search .................... 294/86.24, 86.25, 89, 294/93–97, 116; 118/503, 630–635; 198/377, 378, 803.9, 803.12; 279/1 F, 1 Q, 2 R, 121

[56] References Cited

U.S. PATENT DOCUMENTS

| | | | |
|---|---|---|---|
| 976,325 | 11/1910 | Wheeler et al. | 294/94 X |
| 1,574,430 | 2/1926 | Lemon . | |
| 1,944,255 | 1/1934 | McFall et al. | 279/2 R |
| 2,624,610 | 1/1953 | Murphy | 294/96 |
| 2,662,833 | 12/1953 | Helmuth | 118/635 X |
| 2,830,821 | 4/1958 | Bystrom | 279/2 R |
| 2,865,640 | 12/1958 | Watson et al. | 294/94 X |
| 2,882,061 | 4/1959 | Johnson | 279/2 R |
| 2,888,127 | 5/1959 | Uhlig . | |
| 3,133,496 | 5/1964 | Dubuit . | |
| 3,269,516 | 8/1966 | Lucas . | |
| 3,469,670 | 9/1969 | Cartwright . | |
| 3,545,803 | 12/1970 | Ruscitti | 294/94 |
| 3,841,687 | 10/1974 | Banyas et al. . | |
| 3,944,058 | 3/1976 | Strauss . | |
| 4,086,999 | 5/1978 | McDonald . | |
| 4,096,937 | 6/1978 | Wallace . | |
| 4,099,486 | 7/1978 | Bialorucki et al. | 118/635 |
| 4,291,910 | 9/1981 | Maupate | 294/95 |
| 4,304,398 | 12/1981 | Crowell | 294/95 X |
| 4,435,146 | 3/1984 | Wiatt et al. . | |
| 4,572,355 | 2/1986 | Hunter | 198/803.12 |
| 4,625,854 | 12/1986 | Deichmann et al. . | |
| 4,640,406 | 2/1987 | Willison . | |

FOREIGN PATENT DOCUMENTS

| | | | |
|---|---|---|---|
| 503867 | 9/1979 | Australia . | |
| 218567 | 5/1961 | Austria | 294/96 |
| 495040 | 8/1950 | Belgium | 294/96 |
| 2726870 | 1/1979 | Fed. Rep. of Germany | 294/94 |
| 3127209 | 1/1983 | Fed. Rep. of Germany . | |
| 1135656 | 5/1957 | France | 294/94 |
| 2241476 | 3/1975 | France . | |
| 527029 | 5/1955 | Italy . | |
| 59158741 | 1/1985 | Japan . | |
| 563352 | 7/1977 | U.S.S.R. | 294/94 |
| 633771 | 11/1978 | U.S.S.R. . | |
| 8505346 | 12/1985 | World Int. Prop. O. . | |

*Primary Examiner*—Johnny D. Cherry
*Attorney, Agent, or Firm*—Renner, Otto, Boisselle & Sklar

[57] ABSTRACT

A container holding device intended for use with a chain conveyor for conveying containers such as bottles. The container holding device for receiving and gripping open-ended containers includes an elongated spindle and a chuck mounted for telescoping movement on the spindle. The chuck includes jaws arranged around the spindle and engageable by a cam on the spindle which controls radial expansion and contraction of the jaws. The jaws support radially outwardly thereof one or more resilient members such as O-rings for applying resilient gripping and friction holding force to the interior surface of the container telescoped over the jaws. For use with an overhead chain conveyor, the container holding device may be attached to a pin depending from the chain. The container holding device may include a housing rotatably mounted on the pin and a sprocket for effecting controlled rotation of the container holding device and hence a container carried thereby during passage through one or more of the processing stations.

34 Claims, 3 Drawing Sheets

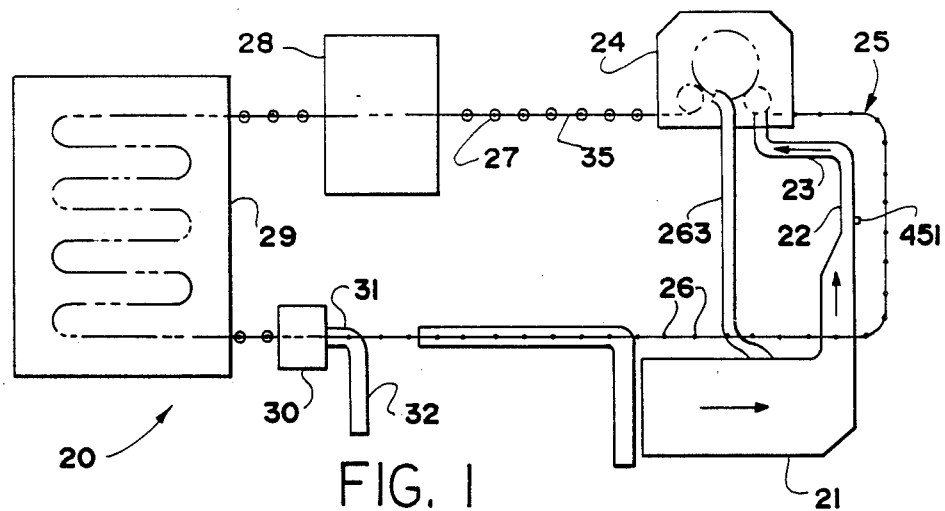
FIG. 1
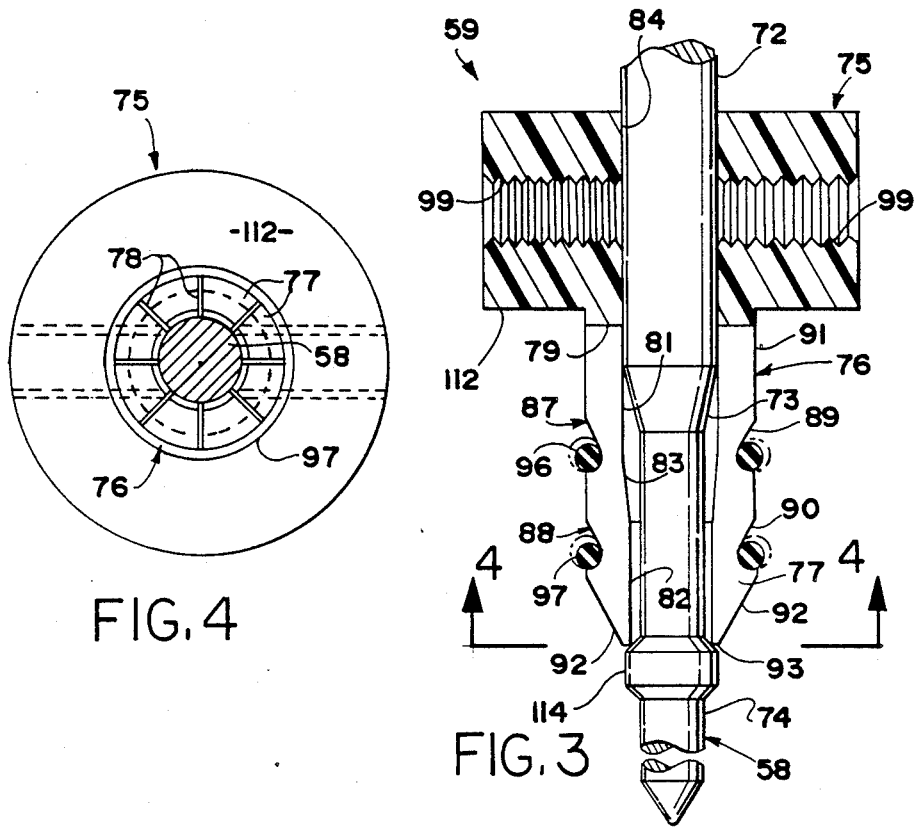
FIG. 4
FIG. 3

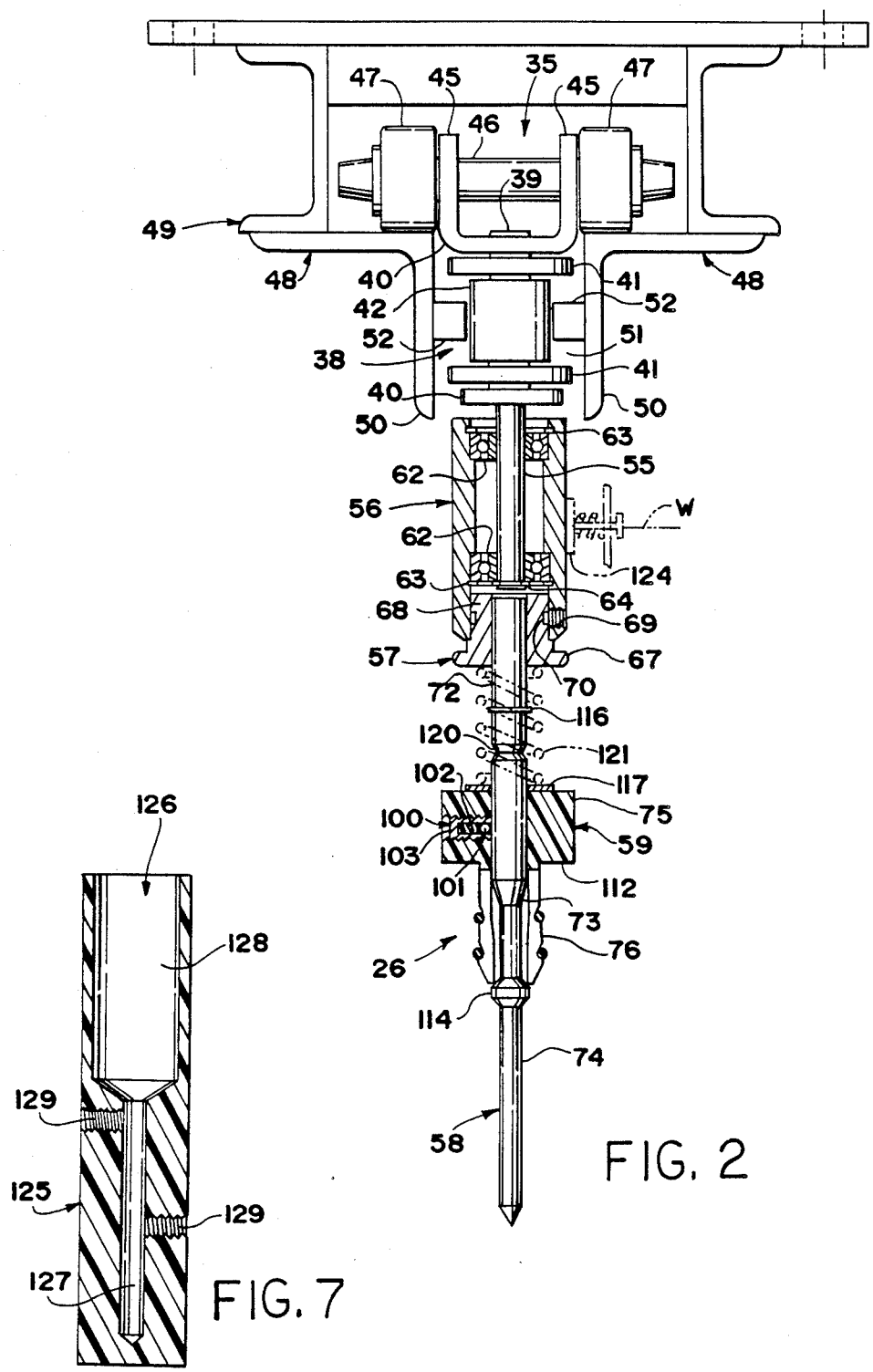

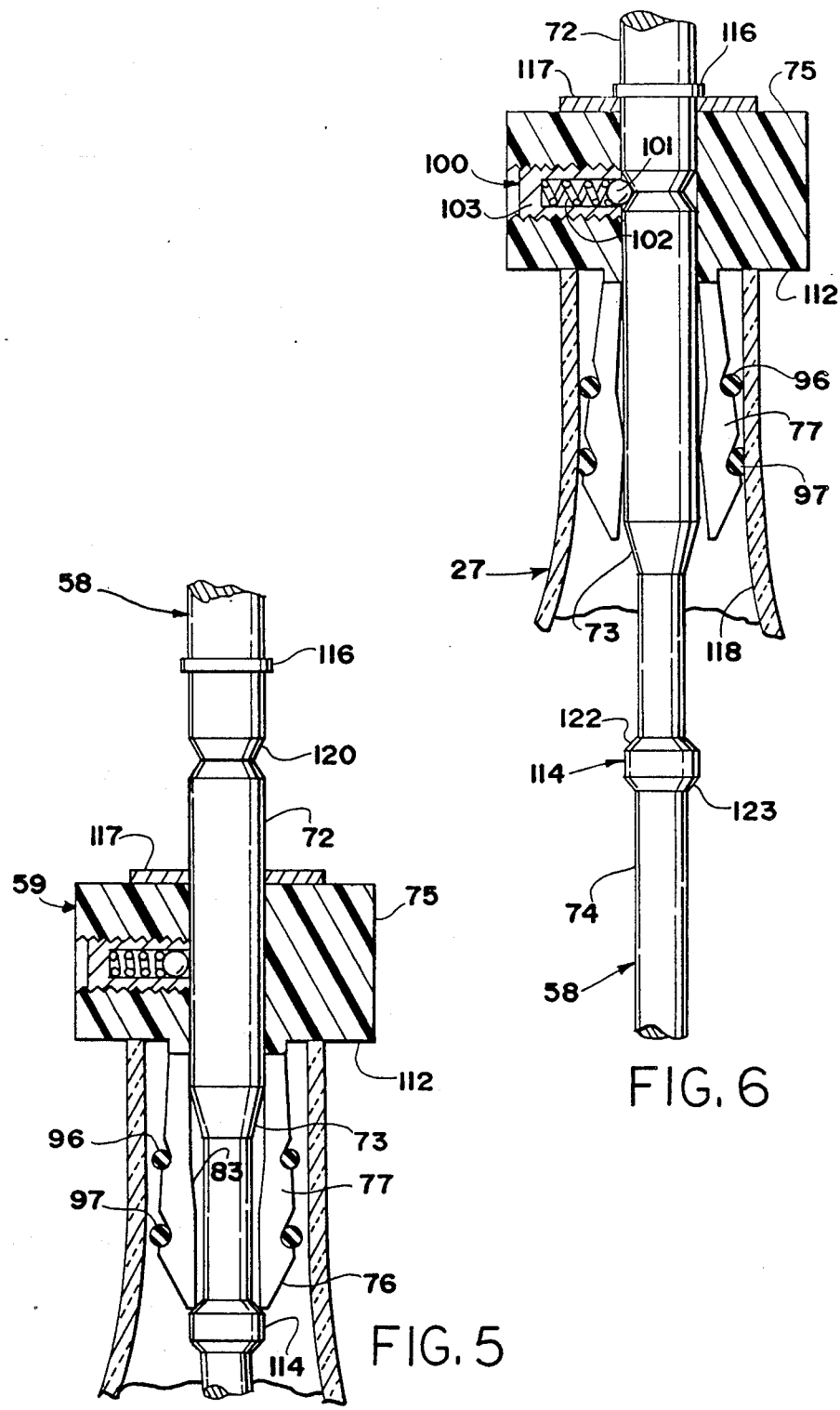

ROTATIONAL CONTAINER HOLDING DEVICE AND METHOD

This is a continuation of co-pending application Ser. No. 07/069,704 filed on Jul. 2, 1987, now abandoned.

The present invention generally relates to systems for handling containers and for moving them through various operational steps in an efficient and controlled manner. More particularly, the invention is directed to a rotational container holding device for carrying containers having an open end such as bottles. The holding device is particularly suited for spray coating operations such as where a glass bottle is provided with a plastic coating to obtain desired decorative finish and strength characteristics while permitting reduction of glass wall thickness.

BACKGROUND OF THE INVENTION

In U.S. Pat. No. 4,625,854, there is disclosed a container transfer system including an in-feed conveyor for delivering newly formed, uncoated plastic containers in a single file to a handling and conveying system. A transfer conveyor reorients the container from an upright condition to a substantially horizontal condition moving in timed and spaced relationship to a series of container holding devices on a carrier conveyor. The carrier conveyor is positioned adjacent the transfer conveyor and the container holding devices are advanced toward and grip each container at its neck to remove it from the transfer conveyor and then move the containers to subsequent finishing operations. In a typical finishing operation, the moving container holding devices position the containers within a coating chamber, rotate the containers within the coating chamber to assure full and uniform coating of the containers and to provide sufficient rotational movement so that the coating does not sag or drip but is evenly distributed, and thereafter move the containers into and through a curing oven.

In U.S. Pat. No. 4,640,406, the carrier conveyor and the container holding devices are described in greater detail. As therein shown, one form of container holding device extends in a generally horizontal orientation from one side of the carrier conveyor and includes an inner housing slidably mounted on a supporting spindle, an outer housing rotatably mounted with respect to the inner housing and slidably mounted with respect to the spindle, and a container gripping member at the outer end of the outer housing for gripping a container by its neck. Two forms of gripping members are disclosed, one for gripping around the outer diameter (exterior) surface of the neck and the other for gripping the inner diameter (interior) surface of a container adjacent its open end. The latter form of gripping member includes a mandrel provided with a plurality of grooves for receiving O-rings for engaging the interior surface of the container for retaining the container on the mandrel. The other form of gripping member includes an open ended collet divided into several segments by slits which segments act together to snap over the container's neck as the collet is telescoped onto the container's neck. A different gripping chuck is used for each size range of bottles. Accordingly, to convert the conveyor to a different bottle size range, each gripping chuck had to be replaced.

SUMMARY OF THE INVENTION

A container holding device according to the present invention primarily is intended for use with a chain conveyor for conveying containers such as bottles from an input station through one or more processing stations to an output station. Such container holding device for receiving and securely gripping open-ended containers is characterized by an elongated spindle and a chuck mounted for telescoping movement on the spindle. The chuck includes jaws arranged around the spindle and engageable by a cam on the spindle which controls radial expansion and contraction of the jaws. The jaws support radially outwardly thereof one or more resilient members such as O-rings for applying resilient gripping and friction holding force to the interior surface of the container telescoped over the jaws. For use with an overhead chain conveyor, the container holding device may be attached to a pin depending from the chain. The container holding device may include a housing rotatably mounted on the pin and a sprocket for effecting controlled rotation of the container holding device and hence a container carried thereby during passage through one or more of the processing stations.

According to one particular aspect of the invention, a container holding device for gripping and holding open-ended containers at the interior surface of the container comprises a plurality of jaws arranged around an axis of the container holding device for radial expansion and contraction, control means movable axially with respect to the jaws for controlling radial expansion and contraction of the jaws, and resilient friction means supported by the jaws and urgeable radially outwardly by the jaws for resiliently applying gripping force and friction holding force to the interior surface of a container telescoped axially over the jaws. The resilient friction means preferably includes one or more annular resilient members such as O-rings retained on the jaws at axially-spaced apart locations. Preferably, the friction means such as the O-rings is/are easily replaceable such as with different sizes of O-rings for use of the device with different sizes of containers.

According to another aspect of the invention, a container holding device for gripping and holding containers comprises a shaft, a chuck mounted for telescoping movement on the shaft, the chuck including a plurality of jaws arranged around the shaft for radial expansion and contraction, and cam means on the shaft for controlling radial expansion and contraction of the jaws during telescoping movement of the chuck on the shaft. The device may also include spring means for automatically positioning an empty chuck at a prescribed location on the shaft.

Further in accordance with the invention, preferred chucks are adapted for removal from respective shafts or spindles by hand, i.e., without tools, for easy and quick replacement of the chucks in a conveyor system so that different size chucks can be readily installed for handling different size containers. The invention also encompasses methods of using the device and adapting the device for use with different sizes and/or shapes of containers.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

A preferred embodiment of the invention has been chosen for purposes of illustration and is shown in the accompanying drawings of which:

FIG. 1 is a schematic plan view of a container transfer system including a carrier conveyor;

FIG. 2 is an elevational view of a segment of the carrier conveyor looking along the movement path thereof and showing, partly in section, a container holding device according to the invention;

FIG. 3 is an enlarged portion of FIG. 2 with some parts removed;

FIG. 4 is a sectional view of the container holding device taken along the line 4—4 of FIG. 3;

FIG. 5 is a view showing a container at a position just prior to actuation of the container holding device;

FIG. 6 is a view showing the container holding device actuated to engage and grip the container at its interior surface; and FIG. 7 is a sectional view of a spindle cover attachable to the container holding device to protect the same when not being used to engage and grip a container during operation of the container transfer system.

DETAILED DESCRIPTION OF THE INVENTION

Referring initially to FIG. 1, a container transfer system incorporating the invention is indicated generally by reference numeral 20. The container transfer system 20 includes infeed conveyors 21–23 which may be of mass transport type for single file delivery of containers such as bottles to a loading mechanism 24. The loading mechanism 24 operates to automatically transfer the containers onto an elevated carrier conveyor 25 equipped with container holding devices 26 preferably located on precise centers. The containers are timed, spaced and loaded onto the overhead carrier conveyor 25 which moves the containers in timed and spaced relationship to and through one or more processing stations. For example, the containers, indicated by reference numeral 27, may be moved by the carrier conveyor 25 through a spray booth 28 for applying a coating to the outer surface of the containers, then further through a curing booth or oven 29, other processing stations if desired, and finally to an unloading mechanism 30. The unloading mechanism 30 operates to automatically transfer the containers from the overhead carrier conveyor 25 to outfeed or take-away conveyors 31 and 32 which may be of mass transport type.

The carrier conveyor 25 comprises an endless chain conveyor 35 to which the container holding devices 26 are attached and located on precise centers. In the illustrated system 20, the chain conveyor 35 not only carries and moves the container holding devices 26 horizontally along the path of the carrier conveyor, but it also is used to drive the loading mechanism 24 and unloading mechanism 30 and further to maintain proper timing in the system. The chain conveyor 35 and container holding devices 26 are hereinafter described in greater detail. The loading mechanism 24 and unloading mechanism 30 are mentioned for environmental purposes and do not form a part of the present invention.

In FIG. 2, a section of the chain conveyor 35 is shown in end view. Also shown is a representative one of the container holding devices 26 which are spaced apart, preferably equally, along the length of the chain conveyor. The chain conveyor 35 includes a roller chain 38 comprising, in repetition, a link pin 39 connecting outer links 40 to inner links 41 for articulated movement. Mounted for rotation on the pin 39 between the inner links 41 is a roller 42.

In the illustrated embodiment, the chain conveyor 35 and container holding devices 26 of the carrier conveyor 25 are oriented to hold containers in vertical position during horizontal translating movement thereof along the path of the carrier conveyor. More particularly, the link pins 39 of the roller chain 38 are oriented vertically for relative pivoting movement of the links 40, 41 about vertical axes.

At spaced intervals along the length of the chain conveyor 35, the upper one of paired outer links 40 is provided with upright legs 45 through which an axle 46 passes. Mounted to the ends of the axle 46 outwardly of the legs 45 are respective carrier rollers 47 which ride on respective runner rails 48 of a fabricated conveyor track assembly 49. The runner rails 48 include respective depending flanges 50 in spaced apart parallel relationship. The flanges 50 define therebetween a channel 51 through which the roller chain 38 moves. Transverse alignment of the roller chain is maintained by guide blocks 52 attached to the depending flanges 50 of the runner rails. The guide blocks 52 project inwardly and define therebetween a containment space for guided passage therebetween of the link pin rollers 42. At each mounting location for a container holding device 26, the roller chain 38 has secured thereto a depending attachment pin 55.

The container holding device 26 generally includes a spindle housing 56 mounted for rotation on the attachment pin 55, a spindle sprocket 57 secured to the spindle housing 56, a shaft or spindle 58 secured at its upper end to the spindle sprocket 57, and a container gripping chuck 59 mounted for telescoping sliding movement on the spindle 58. The spindle housing 56 has a tubular body concentric with and rotatably mounted on the attachment pin 55 by vertically spaced apart ball bearings 62. The upper and lower ends of the spindle housing are counterbored to receive the bearings 62 and the bearings are held against the inner shoulders (bottoms) of the counterbores by retaining rings 63. The assembly of the spindle housing and bearings is vertically supported on the attachment pin 55 by retaining ring 64.

The spindle sprocket 57 has a lower sprocket portion 67 and an upper reduced diameter tubular portion 68. The upper tubular portion 68 is fitted in the lower counterbore of spindle housing 56 and is retained therein by one or more set screws (not shown) screwed into respective threaded bores 69. Preferably the upper tubular portion 68 is provided with an annular groove or recess(es) 70 to receive the inner end of each or respective set screw(s) to provide interference against relative movement between the spindle sprocket from the spindle housing.

The spindle 58, which is coaxial with the spindle sprocket 57 and spindle housing 56, has its upper end secured in suitable manner to the spindle sprocket for rotation therewith. For example, the spindle may be welded to the spindle sprocket or, more preferably, the spindle sprocket may be shrink fitted on the spindle. Going from top to bottom in FIG. 2, the spindle 58 has a cylindrical upper portion 72, a short tapered cam portion 73 and a reduced diameter lower end portion 74.

With additional reference to FIGS. 3 and 4, the gripping chuck 59 has a generally tubular main body 75 from which a collet 76 depends. The collet 76 is generally cylindrical with the cylindrical wall thereof being divided into several, preferably eight, axially elongate jaws or fingers 77 by means of slits 78 extending from the open end of the collet to a point 79 preferably short of the main body 75 of the chuck. The chuck or at least the collet 76 is formed of a suitable resilient material whereby the finger-like jaws 77 are resiliently radially deflectable in a cantilever-like fashion for radial expansion and contraction of the collet. The chuck preferably is formed as a single integral piece from a suitable UHMW plastic.

As best seen in FIG. 3, the inner surface of each jaw or finger 77 has an upper portion 81, a lower portion 82 radially inwardly offset from the upper portion, and an intermediate portion 83 sloping radially outwardly and upwardly from the lower portion 82 to the upper portion 81. In the relatively unflexed condition of the fingers seen in FIG. 3, the upper inner surface portions 81 of the fingers define a circle equal in diameter to a center bore 84 through the main body 75. The center bore 84 is sized to slide closely on the upper portion 72 of the spindle 58. The lower inner surface portions 82 of the fingers in their relatively unflexed condition seen in FIG. 3 define a circle with a diameter less than the diameter of the upper portion 81 of the spindle. The intermediate inner surface portion 83 of each finger, which is sloped with respect to the longitudinal axis of the collet, may have a taper corresponding generally to that of the cam surface 73 on the spindle. In the illustrated preferred embodiment, the sloped intermediate surface 83 of each finger is located approximately midway along the length of the fingers and generally in the region of a pair of annular grooves 87 and 88 provided on the outer diameter surface of the collet.

The annular grooves 87 and 88 are formed by respective sets of circumferentially arranged recesses 89 and 90 in the radially outer surfaces of the collet fingers 77. The two sets of circumferentially arranged recesses, i.e., the two annular grooves on the outer diameter surface of the collet, are axially spaced apart. The recesses 89 and 90 in each finger are located in a generally straight outer surface portion 91 normally extending parallel to the axis of the spindle 58 when the chuck 59 is radially contracted as seen in FIG. 3. The straight outer surface portion 91 terminates below the lower recess 90 at a sloped outer surface portion 92 extending to the forward end face 93 of the finger. The sloped surfaces 92 at the lower ends of the fingers provide the collet with a tapered leading end for facilitating insertion of the collet into the open end of a bottle or other container with which the chuck is being used to grip and hold.

The annular grooves 87 and 88 retain therein respective resilient gripping elements 96 and 97 which preferably are circumferentially continuous and circumscribe the fingers 77. The gripping elements 96 and 97 may be conventional O-rings and a preferred O-ring is made of neoprene having substantially greater resiliency than the material of the fingers and having suitable friction characteristics for gripping the interior surface of a glass bottle, i.e., having a relatively high coefficient of friction with respect to the interior surface of the container for positive frictional gripping of the container. More particularly, the resilient gripping elements 96 and 97 enable the container to be held on the collet against downward axial slippage without the fingers having to urge the gripping elements 96 and 97 under high radial expansion forces against the interior surface of the container.

In the illustrated embodiment, the upper groove 87 and O-ring 96 are located generally at the upper end of the sloped intermediate inner surfaces 83 of the fingers 77 and the lower groove 88 and O-ring 97 are generally located at an elevation just below the sloped intermediate inner surfaces of the fingers and in the region of the lower inner surfaces 82 of the fingers. The recesses 89, 90 in the radially outer surfaces of the fingers preferably are relatively sharply inset at their lower ends for securely retaining the O-ring 96, 97 within the groove against downward forces acting on the O-ring when gripping and supporting a container. The upper end of each recess may be sloped to facilitate assembly of the O-rings onto the collet. The O-rings may be easily rolled upwardly along the sloped upper surface portions of the recesses and out of the grooves onto the straight outer surface portions 91 for easier grasping during, for example, removal of the O-rings and replacement with different size O-rings. The recesses, in particular, may have the illustrated inverted semi-heart or semi-teardrop shape.

The tubular main body 75 of the chuck 59 is mounted at center bore 84 for sliding telescoping movement on the upper portion 72 of the spindle 58. Extending radially from the center bore 84 are one or more threaded bores 99. As seen in FIG. 2, a ball detent device 100 is threaded into each bore 99. The ball detent device includes a ball 101 urged radially inwardly by a spring 102 housed within a center bore on set screw 103. During telescoping (axial) movement of the chuck 75 along the spindle 58, the ball of each detent device will ride along the outer surface of the spindle.

As seen in FIGS. 2–4, the main body 75 has a transverse dimension greater than the collet 76 for forming at its bottom an abutment surface 112. The abutment surface 112 is located at the upper end of the collet and extends radially outwardly of the collet fingers 77. As is preferred, the main body may be generally cylindrical and of a diameter greater than the generally cylindrical collet thereby forming the annular abutment or shoulder surface 112 at the upper end of the collet.

Referring now to FIGS. 5 and 6, upper and lower positions and the operation of the container holding device 26 are illustrated. In FIG. 5, and also in FIGS. 2 and 3, the gripping chuck 59 is shown in its lower position. In its lower position, the chuck may be located at or supported atop a retention stop 114 provided on the lower section 74 of the spindle 58. The stop 114 is formed by an annular band or bead surrounding the lower spindle section and which may be integral therewith. The band 114 operates to limit or restrict downward axial movement of the chuck. When the chuck is in its lower position, the collet 76 is radially contracted or collapsed as shown.

In normal operation of the container holding device 26, a container such as bottle 27 is telescoped at its open end over the spindle 58 and the collet 76 to engagement with the abutment surface 112 at the bottom of the chuck body 75 as seen in FIG. 5. As will be appreciated, the bottle may be pushed onto the spindle, the spindle pushed into the bottle, or both the bottle and spindle moved towards each other to obtain relative movement for placement of the bottle on the holding device. Also, such relative movement may be effected either manually or mechanically with the bottle typically being pushed manually or mechanically onto the holding device for carriage by the conveyor chain.

As the bottle is further telescoped over the spindle from its FIG. 5 position, it urges the chuck 59 telescopically along the spindle and to engagement with a stop 116 secured to the upper portion 72 of the spindle as seen in FIG. 6. The illustrated stop 116 is a snap ring retained in a groove in the spindle. There also may be provided atop the chuck body a flat washer 117 for engaging the snap ring 116 to minimize wear on the plastic chuck body 75.

As the chuck 59 is thusly raised from its lower position in FIG. 5 to its upper position in FIG. 6, the sloped intermediate inner (cam follower) surfaces 83 of the collet fingers 77 will move to engagement with the tapered cam portion 73 of the spindle whereupon the collet fingers will be flexed radially outwardly. In this manner the collet is radially expanded to radially outwardly urge or expand at least one of the O-rings 96, 97 encircling the collet fingers to gripping engagement with the inner surface 118 of the bottle thereby to hold the bottle to the container holding device. Preferably two or more O-rings are provided for gripping the bottle, as illustrated, to ensure adequate holding force should one of the rings encounter an irregularity in the interior surface 118 preventing proper engagement and reducing the amount of holding force obtained by such ring. The chuck also operates to close off the open end of the bottle primarily by engagement of the top end of the bottle against the abutment surface 112 and secondarily by the sealing afforded by the O-rings 96 and 97 against the inner diameter surface 118 of the bottle.

After the bottle 27 has been telescoped axially over the spindle 58 sufficiently to raise the chuck 59 to its upper position in FIG. 6, the chuck will be releasably held in this upper position by the detent device 100 coacting with a V-groove 120 provided on the spindle. The chuck will be retained in its upper position until urged downwardly with sufficient enduring force overcoming the retaining force of the detent device and any frictional resistance to sliding movement of the chuck along the spindle towards its lower position. During this downward urging of the chuck, the collet will be controllably radially contracted to its smaller diameter releasing the bottle and allowing the bottle to separate from the chuck, as by dropping from the chuck, and more generally the container holding device. It will be appreciated that removal may be effected, if desired, by pulling or pushing axially downwardly on the bottle. The chuck gripping the bottle will be pulled down with the bottle until the collet contracts sufficiently to release the bottle therefrom. If desired, a spring may be provided to return the chuck to its proper empty chuck position seen in FIG. 5. For example, a coil spring may be interposed between the sprocket 57 and the chuck 59 as indicated in broken lines at 121 in FIG. 2. Such spring 121 should be strong enough to position the empty chuck but not strong enough to position a chuck loaded with a container as the latter might cause the container to be released at the wrong time or location.

The illustrated chuck 59 may be easily and quickly adapted for gripping containers having different inner diameters adjacent their open ends. This adaptation can be effected by replacing one or more of the O-rings 96 and 97 with O-rings having generally the same diameter but different ring thicknesses (cross-sectional diameters), as is illustrated in broken lines in FIG. 3.

Different sizes and shapes of containers may also be accommodated by replacing the chuck 59 with a different size or shaped chuck. This may be accomplished without the need for any tools by simply axially pulling the chuck downwardly over the stop 114 on the lower spindle section 74. The stop 114 has an outer diameter equal or less than the diameter of the bore 84 through the chuck body 75 to permit axial passage of the body thereover. Also, the collet fingers 77 will flex outwardly to clear the stop as they are axially moved thereover. Preferably the stop 114 has a sloped or chamfered upper surface 122 to facilitate removal of the chuck and a sloped or chamfered bottom surface 123 to facilitate assembly of another chuck onto the spindle. Again, this replacement of one size chuck with a chuck of a different size may be easily and quickly accomplished without the use of tools. This is particularly important considering that a typical container transfer system for processing bottles or other containers may include, for example, thousands of container holding devices including chucks that would have to be replaced between runs for different sizes and/or shapes of containers.

It also will be observed that by virtue of the chuck 59 engaging the interior surface of the container 27, the entire outer surface of the container is available for reception of a coating or other treatment. If the coating is sprayed onto the bottle, the abutment of the top of the bottle against the annular abutment surface 112 precludes or substantially prevents passage of the spray into the interior of the bottle which may be undesirable. As will also be appreciated, the bottle held by the chuck may be rotated by rotation of the sprocket 57 to which the spindle 58 is secured. This rotation may be effected by movement of the container holding device relative to a chain or the like engaging the sprocket. As a result of the relative movement, the sprocket will be rotated thereby to rotate the chuck and hence the bottle as may be particularly desirable during sprayed application of a coating onto the bottle.

Further in accordance with the invention, the spindle 58 extending into the container may be of suitable length and utilized as an electrode for an electrostatic painting process or the like. A desired potential, such as a ground potential, may be applied to the spindle in any suitable manner, such as by a spring-loaded wiper bar shown in broken lines at 124 in FIG. 2. The wiper bar 124 may be located in an electrostatic spray booth adjacent the path of the holding devices of the conveyor. The wiper bar may be vertically positioned to engage the outer diameter surface of the spindle housing 56 of each holder during the time that an electrostatic spray coating is being applied to the container carried by the holder. The spindle housing 56 and spindle 58 are both formed of electrically conductive material and electrically connected by spindle sprocket 57 whereby the spindle will be brought to desired potential by the wiper bar 124 which is connected to a source of potential by wire lead W. The spindle may thusly be maintained at ground potential to draw positively charge coating material to the container surrounding the spindle.

Referring now to FIG. 7, one or more of the container holding devices of the conveyor which are not intended to receive a container may have slipped over the lower portion thereof a cover 125 to avoid involvement with finishing operations such as coating since the lower portion will not be covered by a container. The cover 125 has a stepped diameter, axially extending cavity 126. The lower, smaller diameter portion 127 of the cavity is sized to accommodate the lower spindle portion 74. The upper, larger diameter portion 128 is sized to be telescoped over the collet 76 and butted against the shoulder surface 112 to prevent coatings or the like from fouling the chuck. Nylon set screws (not shown) may be threaded into bores 129 to engage the spindle and thereby hold the cover on the spindle independently of the chuck.

Although the invention has been shown and described with respect to a preferred embodiment, those skilled in the art will appreciate that various alterations and modifications can be made without departing from the scope or spirit of the invention defined in the following claims.

What is claimed is:

1. A device for gripping and holding different sized open-ended containers, said device being adapted to engage said different sized containers at an interior surface thereof, said device further comprising a plurality of jaws arranged around an axis of said device for radial expansion and contraction, control means movable axially with respect to said jaws for controlling radial expansion and contraction of said jaws, and resilient friction means supported by said jaws and urgeable radially outwardly by said jaws for resiliently applying gripping force and friction holding force to the interior surface of a container telescoped over said jaws, said resilient means including at least one annular resilient member circumscribing said jaws, and said member being replaceable with different size resilient means for applying said gripping and friction forces to different sized open-ended containers.

2. A device as set forth in claim 1, wherein said resilient member is an O-ring.

3. A device as set forth in claim 1, wherein said resilient means includes a second annular resilient member circumscribing said jaws and axially spaced apart from said one annular resilient member.

4. A device as set forth in claim 1, wherein said jaws have recesses in their radially outer surfaces for retaining said one annular resilient member.

5. A device as set forth in claim 1, wherein said jaws include respective resiliently deflectable fingers extending axially from a body in cantilever-like fashion.

6. A device as set forth in claim 5, wherein said control means includes cam means movable axially with respect to said fingers in a first direction for causing said fingers to flex radially outwardly from a relatively unflexed condition to a flexed condition and in the opposite direction for permitting return of said fingers to their relatively unflexed condition.

7. A device as set forth in claim 1, comprising an elongate member and an interchangeable chuck mounted on said elongate member for telescoping axial movement, said chuck including said jaws, and said jaws being arranged around said elongate member, said chuck being adapted for tool-less removal from said elongate member and said device being adapted to accept chucks replaceable by hand without tools for handling different size containers.

8. A device as set forth in claim 7, wherein said control means includes cam means on said elongate member engageable by said jaws during telescoping movement of said chuck relative to said elongate member.

9. A device as set forth in claim 8, wherein said jaws have radially inner surfaces engageable by said cam means for urging said jaws radially outwardly.

10. A container holding device for gripping and holding containers, said device comprising means for gripping and holding containers of different sizes, said means including a shaft, a chuck mounted for telescoping movement on said shaft, said chuck including a plurality of jaws arranged around said shaft for radial expansion and contraction, and cam means on said shaft for controlling radial expansion and contraction of said jaws during telescoping movement of said chuck on said shaft, and wherein said chuck includes a body slidable on said shaft, said jaws are carried by said body, and said body has abutment means engageable by a container telescoped over said shaft and movable by the container along said shaft to effect actuation of said jaws for gripping the container.

11. A device as set forth in claim 10, wherein said abutment means includes a surface on said body extending radially outwardly of said jaws for engagement by the end of a container telescoped over said jaws.

12. A device as set forth in claim 10, wherein said jaws include respective resilient fingers extending axially from said body in cantilever-like fashion.

13. A device as set forth in claim 10, including resilient means for urging said chuck to a prescribed location on said shaft.

14. A device as set forth in claim 10, wherein said chuck is removable from said shaft by hand without tools.

15. A device as set forth in claim 10, including extension means on said shaft for extending into the interior of a container gripped by said jaws, and means for electrically connecting said extension means to a source of electrical potential outside the container.

16. The device of claim 10, said chuck being rotatable with respect to said shaft.

17. A container holding device for gripping and holding containers, said device comprising means for gripping and holding containers of different sizes, said means including a shaft, a chuck mounted for telescoping movement on said shaft, said chuck including a plurality of jaws arranged around said shaft for radial expansion and contraction, and cam means on said shaft for controlling radial expansion and contraction of said jaws during telescoping movement of said chuck on said shaft, and wherein said shaft has a radially enlarged retention stop means thereon for normally retaining said chuck on said shaft, and said chuck is radially expandable to permit passage thereof over said retention means for removal of said chuck from said shaft.

18. A device as set forth in claim 17, wherein said chuck includes a body slidable on said shaft, and said jaws include respective resilient fingers extending axially from said body in cantilever-like fashion.

19. A device as set forth in claim 18, wherein said fingers have sloped surfaces at their free ends forming a generally conical end of said chuck.

20. A device as set forth in claim 18, said cam means being movable axially with respect to said fingers in a first direction for causing said fingers to flex radially outwardly from a relatively unflexed condition to a flexed condition and in the opposite direction for permitting return of said fingers to the relatively unflexed condition.

21. A method of gripping and holding open-ended containers at the interior surface thereof comprising the steps of inserting into the open end of said container a plurality of interchangeable jaws arranged around an axis of a container holder device for radial expansion and contraction, activating a control means movable axially with respect to said jaws for controlling radial expansion and contraction of said jaws, and engaging the interior of said container with resilient friction means supported by said jaws and urgeable radially outwardly by said jaws for resiliently applying gripping force and friction holding force to the interior surface of a container telescoped over said jaws, and said method further being characterized by the steps of using the device with one size of friction means for a first size of containers and then replacing the friction means of such one size with friction means of a different size for use of the device with a different size of containers.

22. A method as set forth in claim 21, wherein the step of engaging further includes the step of causing at least one annular resilient member circumscribing said jaws to contact the interior of said container.

23. A method as set forth in claim 22, wherein said step of causing contact with the container includes causing contact with a resilient O-ring.

24. A method as set forth in claim 21, wherein said step of inserting a plurality of jaws includes inserting respective resiliently deflectable fingers extending axially from a body in cantilever-like fashion.

25. A method as set forth in claim 24, wherein said step of activating a control means includes the step of utilizing a cam means movable axially with respect to said fingers in a first direction for causing said fingers to flex radially outwardly from a relatively unflexed condition to a flexed condition and in the opposite direction for permitting return of said fingers to their relatively unflexed condition.

26. A method as set forth in claim 21, wherein the step of inserting includes the further step of providing an elongate member and a chuck mounted on said elongate member for telescoping axial movement, said chuck including said jaws, and said jaws being arranged around said elongate member.

27. A method as set forth in claim 26, wherein said step of activating a control means includes activating cam means on said elongate member engageable by said jaws during telescoping movement of said chuck relative to said elongate member.

28. A method as set forth in claim 27, wherein said step of inserting further includes the step of providing jaws having radially inner surfaces engageable by said cam means for urging said jaws radially outwardly.

29. A method of gripping and holding open-ended containers at the interior surface thereof comprising the steps of inserting into the open end of said container a plurality of interchangeable jaws arranged around an axis of a container holder device for radial expansion and contraction, activating a control means movable axially with respect to said jaws for controlling radial expansion and contraction of said jaws, and engaging the interior of said container with resilient friction means supported by said jaws and urgeable radially outwardly by said jaws for resiliently applying gripping force and friction holding force to the interior surface of a container telescoped over said jaws, and wherein said step of engaging includes causing first and second annular resilient members to contact the interior of said container, said first and second annular resilient members circumscribing said jaws and being axially spaced apart from one another.

30. A method of gripping and holding open-ended containers at the interior surface thereof comprising the steps of inserting into the open end of said container a plurality of interchangeable jaws arranged an axis of a container holder device for radial expansion and contraction, activating a control means movable axially with respect to said jaws for controlling radial expansion and contraction of said jaws, and engaging the interior of said container with resilient friction means supported by said jaws and urgeable radially outwardly by said jaws for resiliently applying gripping force and friction holding force to the interior surface of a container telescoped over said jaws, and said method further being characterized by the steps of using the device with one size of chuck including the jaws for a first size of containers and then replacing, by hand without tools, the chuck of such one size with a chuck of a different size for use of the device with a different size of containers.

31. A device for gripping and holding different sized open-ended containers, said device being adapted to engage said different sized containers at an interior surface thereof, said device further comprising a plurality of jaws arranged around an axis of the container holder device for radial expansion and contraction, control means movable axially with respect to said jaws for controlling radial expansion and contraction of said jaws, and resilient friction means supported by said jaws and urgeable radially outwardly by said jaws for resiliently applying gripping force and friction holding force to the interior surface of a container telescoped over said jaws, and wherein said jaws are adapted to accommodate and said resilient friction means includes resilient members comprising O-rings of different thicknesses and diameters such that the O-rings may be replaced and said jaws then used with different sized containers.

32. A container holding device for gripping and holding containers, said device comprising means for gripping and holding containers of different sizes, said means including a shaft, a chuck mounted for telescoping movement on said shaft, said chuck including a plurality of jaws arranged around said shaft for radial expansion and contraction, and cam means on said shaft for controlling radial expansion and contraction of said jaws during telescoping movement of said chuck on said shaft, and wherein said chuck is removable from said shaft by hand without tools and said means for gripping and holding includes means to interchange said chuck with other chucks of different sizes.

33. A container holding device for gripping and holding containers comprising a shaft, a chuck mounted for telescoping movement on said shaft, said chuck including a plurality of jaws arranged around said shaft for radial expansion and contraction, and cam means on said shaft for controlling radial expansion and contraction of said jaws during telescoping movement of said chuck on said shaft, said chuck further including a body slidable on said shaft, and said jaws including respective resilient fingers extending axially from said body in cantilever-like fashion, said cam means being movable axially with respect to said fingers in a first direction for causing said fingers to flex radially outwardly from a relatively unflexed condition to a flexed condition and in the opposite direction for permitting return of said fingers to the relatively unflexed condition, said body defining an aperture accommodating said shaft and said cam means being dimensioned for passage through said aperture.

34. The device of claim 33, said body having a portion extending radially outwardly from said fingers, said portion providing abutment means for said container.

* * * * *